United States Patent
Forslund et al.

(10) Patent No.: US 12,277,775 B2
(45) Date of Patent: Apr. 15, 2025

(54) VISION SYSTEM AND METHOD FOR A MOTOR VEHICLE

(71) Applicant: ARRIVER SOFTWARE AB, Linkoping (SE)

(72) Inventors: David Forslund, Linköping (SE); Jon Bjärkefur, Linköping (SE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/322,349

(22) PCT Filed: Jul. 27, 2017

(86) PCT No.: PCT/EP2017/068965
§ 371 (c)(1),
(2) Date: Jan. 31, 2019

(87) PCT Pub. No.: WO2018/024590
PCT Pub. Date: Feb. 8, 2018

(65) Prior Publication Data
US 2019/0180462 A1 Jun. 13, 2019

(30) Foreign Application Priority Data
Aug. 2, 2016 (EP) .................................... 16182309

(51) Int. Cl.
*G06T 7/593* (2017.01)
*G06F 18/22* (2023.01)
(Continued)

(52) U.S. Cl.
CPC .............. *G06V 20/58* (2022.01); *G06F 18/22* (2023.01); *G06T 7/593* (2017.01); *G06T 7/80* (2017.01);
(Continued)

(58) Field of Classification Search
CPC . G06T 7/593; G06T 7/80; G06T 2207/10028; G06T 2207/30252;
(Continued)

(56) References Cited
U.S. PATENT DOCUMENTS 5,850,475 A * 12/1998 Kasao ..................... G06V 10/40
382/268
9,558,563 B1 * 1/2017 Kamarshi ................. G06T 7/20
(Continued)

OTHER PUBLICATIONS

International Search Report and Written Opinion from corresponding PCT application No. PCT/EP2017/068965 dated Sep. 5, 2017 (12 pages).

*Primary Examiner* — Shawn S An
(74) *Attorney, Agent, or Firm* — QUALCOMM Incorporated

(57) ABSTRACT

A vision system (10) for a motor vehicle includes an imaging apparatus (11) adapted to capture images from a surrounding of the motor vehicle, and a processing device (14) adapted to execute an object detection code (15) to detect objects in the surrounding of the motor vehicle by processing images captured by the imaging apparatus (11), and to calculate for each detected object its longitudinal distance relative to the ego vehicle. The vision system includes a gatekeeper code module (33) having a higher functional safety level than the object detection code (15). The gatekeeper code module (33) takes as input objects (32) detected by the object detection code (15) and evaluates if a depth or disparity image (35), in at least a part of an area covering the detected object (32), matches within given tolerances the longitudinal distance of the detected object (32) given by the object detection code (15).

21 Claims, 3 Drawing Sheets

(51) Int. Cl.
  *G06T 7/80* (2017.01)
  *G06V 20/58* (2022.01)
  *B60Q 9/00* (2006.01)
(52) U.S. Cl.
  CPC .... *B60Q 9/008* (2013.01); *G06T 2207/10012* (2013.01); *G06T 2207/10028* (2013.01); *G06T 2207/20021* (2013.01); *G06T 2207/30252* (2013.01); *G06V 2201/07* (2022.01)
(58) Field of Classification Search
  CPC ........... G06T 2207/10012; G06T 2207/20021; G06K 9/6215; G06K 2009/6213; G06K 2209/21; B60Q 9/008
  See application file for complete search history.

(56) References Cited

U.S. PATENT DOCUMENTS

| | | | | |
|---|---|---|---|---|
| 11,151,076 | B2* | 10/2021 | Otsuka | G06F 30/00 |
| 2004/0189453 | A1* | 9/2004 | Sawyer | B60K 28/02 |
| | | | | 340/436 |
| 2005/0231340 | A1* | 10/2005 | Tauchi | G08G 1/161 |
| | | | | 340/903 |
| 2007/0185638 | A1* | 8/2007 | Odenthal | B60W 40/11 |
| | | | | 701/70 |
| 2008/0285799 | A1* | 11/2008 | Chiu | G06K 9/00805 |
| | | | | 382/103 |
| 2009/0195371 | A1* | 8/2009 | Camus | G06V 20/64 |
| | | | | 382/103 |
| 2011/0022247 | A1* | 1/2011 | Stahlin | G08G 1/096725 |
| | | | | 701/1 |
| 2013/0030657 | A1 | 1/2013 | Chatterjee et al. | |
| 2013/0100266 | A1* | 4/2013 | Salsman | G06V 40/166 |
| | | | | 348/E7.085 |
| 2013/0268798 | A1* | 10/2013 | Schade | G06F 11/1487 |
| | | | | 714/38.1 |
| 2013/0342365 | A1* | 12/2013 | Kiefer | B60W 50/16 |
| | | | | 340/901 |
| 2014/0043435 | A1* | 2/2014 | Blayvas | H04N 13/271 |
| | | | | 348/46 |
| 2014/0079336 | A1* | 3/2014 | Venkataraman | G06T 5/002 |
| | | | | 382/275 |
| 2014/0168377 | A1* | 6/2014 | Cluff | H04N 13/246 |
| | | | | 348/47 |
| 2014/0278065 | A1* | 9/2014 | Ren | G06T 17/05 |
| | | | | 701/454 |
| 2015/0015267 | A1* | 1/2015 | Mueller | H04L 25/4904 |
| | | | | 324/426 |
| 2015/0116585 | A1* | 4/2015 | Damhofer | H04N 5/2354 |
| | | | | 348/370 |
| 2015/0210258 | A1* | 7/2015 | Erdem | B60T 8/00 |
| | | | | 701/29.2 |
| 2015/0224988 | A1* | 8/2015 | Buerkle | B60W 30/0956 |
| | | | | 701/45 |
| 2016/0004535 | A1* | 1/2016 | Robertson | G06F 9/30185 |
| | | | | 712/205 |
| 2016/0335755 | A1* | 11/2016 | Hilsebecher | H04N 13/246 |
| 2017/0277652 | A1* | 9/2017 | Franco | G06F 13/4291 |
| 2018/0208060 | A1* | 7/2018 | Kim | B60W 50/14 |

* cited by examiner

VISION SYSTEM AND METHOD FOR A MOTOR VEHICLE

CROSS-REFERENCE TO RELATED APPLICATIONS

This application is a 35 U.S.C. § 371 national phase of PCT International Application No. PCT/EP2017/068965, filed Jul. 27, 2017, which claims the benefit of priority under 35 U.S.C. § 119 to European Patent Application No. 16182309.1, filed Aug. 2, 2016, the contents of which are incorporated herein by reference in their entirety.

FIELD OF THE INVENTION

The invention relates to a vision system for a motor vehicle, and includes an imaging apparatus adapted to capture images from a surrounding of the motor vehicle, and a processing device adapted to execute an object detection code to detect objects in the surrounding of the motor vehicle by processing images captured by the imaging apparatus. The invention relates also to a corresponding vision method.

Such vision systems are generally known, see for example EP 2 219 133 A1.

BACKGROUND

In a stereo vision camera system, objects such as other vehicles and pedestrians can be detected in many different ways, including for example classification in mono images, disparity image or optical flow object segmentation, feature point tracking, etc. Such advanced concepts typically result in a large amount of software code. In order to be able to use the detected objects in safety critical high level applications such as automatic emergency braking or steering assistance, the object detection must be raised to a higher functional safety level, such as Automotive Safety Integrity Level B (ASIL-B). However, having to write the complete object detection code in a higher functional safety level requires a lot of manpower and therefore is very expensive.

An object of the present invention is to provide a cost-effective vision system and method where objects detected by the object detection code can be used in safety critical high level applications such as automatic emergency braking or steering assistance.

SUMMARY AND INTRODUCTORY DESCRIPTION

Embodiments of the present invention solves the above referenced object with the features described herein. A feature of the invention is to avoid having to write the complete object detection code with higher functional safety level quality. Instead a small gatekeeper code module, having a significantly smaller size than the object detection code, and having a higher safety level quality, is placed after, i.e. downstream, the object detection code which can have a non-critical safety level, like Quality Management (QM) level. In this manner, the amount of code that must have a higher functional safety level quality is significantly, for example at least an order of magnitude smaller, than if the complete object detection code would have to have a higher functional safety level. This contributes to an enormous reduction in manpower and costs.

The gatekeeper module takes as input each detected object. Regardless of the object type, like other vehicle, pedestrian, general object, the gatekeeper module evaluates whether the depth image, or alternatively the disparity image, in at least a part of an area covering the detected object, matches within given tolerances the longitudinal distance of the detected object given by the object detection code. In other words, it performs an evaluation whether the depth or disparity image, at or around an image location corresponding to the world position of the detected object, contains any structure at a distance similar to that of the detected object as given by the object detection code. If this is the case, the object is considered as safe to use in a safety critical high level application.

The gatekeeper code module may use a verified depth or disparity image which has been verified to have a higher functional safety level than a depth or disparity image obtained by the object detection code. Also the intrinsic yaw angle calibration of the imaging apparatus is preferably verified to have at least the same functional safety level as the gatekeeper code module and/or the verified depth or disparity image. The above advantageous measures contribute to raising the functional safety level of detected objects having passed the gatekeeper module.

Preferably the gatekeeper code module is executed on a dedicated processing device, i.e. a separate electronic processing device different from the electronic processing device running the object detection code. In this manner, a hardware electric error in the processing device of the object detection code does not impair the function of the gatekeeper code module.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
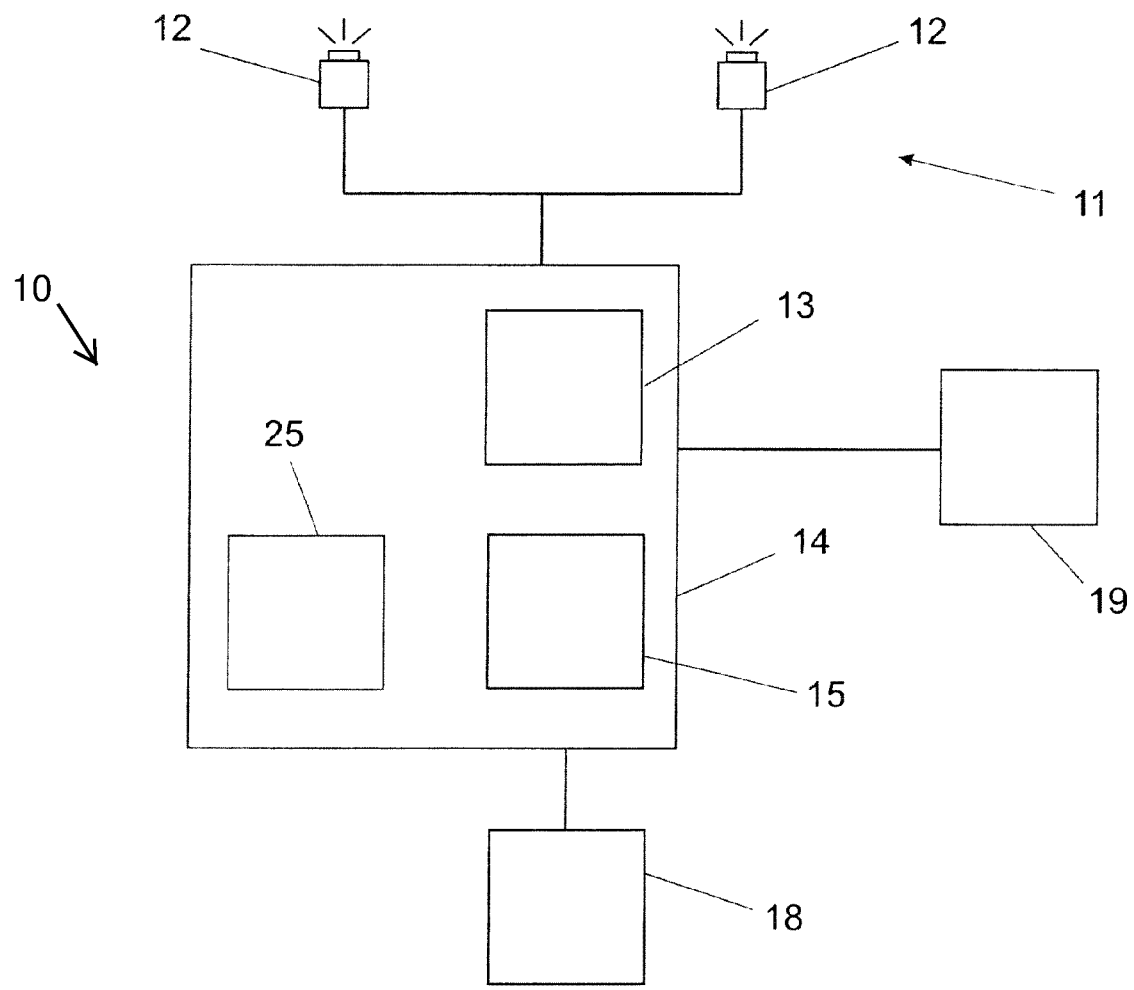
FIG. 1 shows a schematic drawing of a vision system according to an embodiment of the invention.

The vision system 10 is mounted in a motor vehicle and includes an imaging apparatus 11 for capturing images of a region surrounding the motor vehicle, for example a region in front of the motor vehicle. Preferably the imaging apparatus 11 includes one or more optical imaging devices 12, in particular cameras, preferably operating in the visible and/or infrared wavelength range, where infrared covers near IR with wavelengths below 5 microns and/or far IR with wavelengths beyond 5 microns. In some embodiments the imaging apparatus 11 includes a plurality of imaging devices 12 in particular forming a stereo imaging apparatus 11. In other embodiments, only one imaging device 12 forming a mono imaging apparatus 11 can be used.

The imaging apparatus 11 is coupled to a data processing device 14 adapted to process the image data received from the imaging apparatus 11. The data processing device 14 may include a pre-processing section 13 adapted to control the capture of images by the imaging apparatus 11, receive the electrical signal containing the image information from the imaging apparatus 11, rectify or warp pairs of left/right images into alignment and/or create disparity or depth images, which per se is known in the art. The image pre-processing section 13 may be realized by a dedicated hardware circuit, for example a Field Programmable Gate Array (FPGA) or an Application Specific Integrated Circuit (ASIC). Alternatively the pre-processing section 13, or part of its functions, can be realized by software in a microprocessor or a System-On-Chip (SoC) device includes, for example, FPGA, DSP, ARM and/or microprocessor functionality. In the case of a vision system 10 using only one camera 12 the pre-processing section 13 may not be needed.

Further image and data processing carried out in the processing device 14 by an object detection code 15 includes identifying and preferably also classifying possible objects in front of the motor vehicle, such as pedestrians, other vehicles, bicyclists and/or large animals, tracking over time the position of object candidates identified in the captured images, and activating or controlling at least one driver assistance device 18 depending on an estimation performed with respect to a tracked object, for example an estimated collision probability.

The object detection code 15 determines, and assigns to each detected object, the world coordinates of the detected object. The world coordinates are the object's position relative to the vehicle, for example in meters, in particular includes the longitudinal distance, the lateral distance and/or the height above ground of the detected object. The world coordinates are calculated by the object detection code 15 by using the image position of the detected object and the estimated angle of the camera (projection from the image to the outside world). Factors which may influence the world coordinates calculation are height assumptions, scale changes, flat ground assumptions, filtering over time etc. In the case of a stereo imaging apparatus 11, the depth image can be used to get more accurate coordinates especially for roads with dips and sinks, i.e. uneven roads.

The driver assistance device 18 may in particular be provided as a display device to display information relating to a detected object. However, the invention is not limited to a display device. The driver assistance device 18 may in addition or alternatively be provided as a warning device adapted to provide a collision warning to the driver by suitable optical, acoustical and/or haptic warning signals; one or more restraint systems such as occupant airbags or safety belt tensioners, pedestrian airbags, hood lifters and the like; and/or dynamic vehicle control systems such as brake or steering control devices.

The data processing device 14 is preferably a digital device which is programmed or programmable and preferably includes a microprocessor, microcontroller, digital signal processor (DSP) or a System-On-Chip (SoC) device, and preferably has access to, or includes, a memory device 25. The data processing devices 14, 19, pre-processing section 13 and the memory device 25 are preferably realised in an on-board electronic control unit (ECU) and may be connected to the imaging apparatus 11 via a separate cable or a vehicle data bus. In another embodiment, the ECU and one or more of the imaging devices 12 can be integrated into a single unit, where a one box solution including the ECU and all imaging devices 12 can be preferred. All steps from imaging, image pre-processing, image processing to possible activation or control of driver assistance device 18 are performed automatically and continuously during driving in real time.

Figure 2:
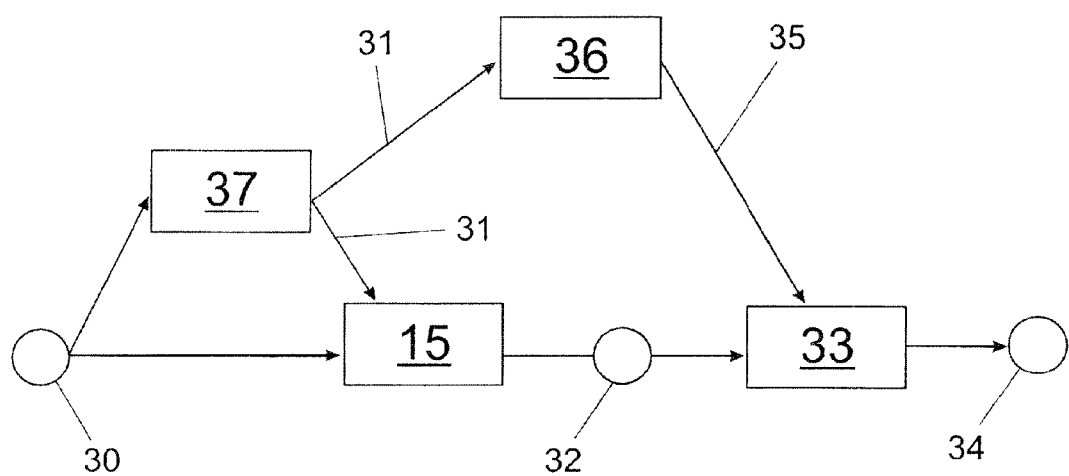
FIG. 2 shows a schematic flow diagram for illustrating operations within the vision system.

An embodiment of the invention is explained in the following on the basis of FIGS. 2 and 3. The left and right images 30 from the imaging apparatus 11, which here is a stereo imaging apparatus, are used to calculate a disparity image 31 by a disparity image calculation code 37 having QM quality corresponding to a non-critical functional safety level. The disparity image calculation code 37 may be executed for example in the pre-processing section 13, as described above, or in the processing device 14. The QM disparity image 31 is used by the QM object detection code 15 to detect objects 32 in the surrounding of the motor vehicle, as described above. The object detection code 15 is executed by the processing device 14. Without the invention, the detected objects 32 would be used for evaluating and deciding the activation of the driver assistance device 18.

As mentioned earlier, for safety critical applications, it may not be sufficient to rely on detected objects having QM safety level, only. Therefore, according to an embodiment of the invention, a gatekeeper code module 33, or gatekeeper module 33 for short, is provided in a processing device 19. The gatekeeper code module 33 has a higher functional safety level, for example ASIL-B level, than the object detection code 15.

Generally, the gatekeeper module 33 lets pass only those detected objects 32 which fulfil a higher functional safety level as provided by the object detection code 15. In other words, the gatekeeper module 33 does not generate new detected objects by itself, but only checks objects detected by the object detection code 15, rejecting those which do not fulfil the higher functional safety standards of the gatekeeper module 33. This implies that the number of verified detected objects 34 verified by the gatekeeper code module 33 is equal or less the number of unverified detected objects 15.

The gatekeeper code module 33 can be composed of a subset of the object detection code 15, re-written in higher functional safety level quality, only. That is, exactly the same object detection as performed by the object detection code 15 can be re-used in the gatekeeper code module 33, but only a few components of it are needed. This is because the goal of the functional safety module 33 is to find bugs in the QM code, and electronic errors in the processing hardware, only, both of which are easy to detect as they manifest in very large errors for the detected objects. In the above manner, the effort for producing the gatekeeper code module 33 can be strongly reduced. The gatekeeper code module 33 can be significantly smaller than the object detection code 15, for example less than half, like one third of the object detection code 15.

The gatekeeper module 33 advantageously evaluates the detected objects 32 using a verified disparity image 35. The verification 36 of the disparity image 31 yielding the verified disparity image 35 uses a verification code having a higher functional safety level, for example ASIL-B, than the unverified disparity calculation code 37.

The verification 36 may be done in different manners. In a preferred embodiment, the disparity data is re-calculated for a number of rows in the image, for example for every other row, or every n-th row, or any other true subset of rows. If the recalculated disparity data matches the corresponding original disparity data 31 within certain tolerances, the entire original disparity image 31 may be considered safe under the higher functional safety level (like ASIL-B), and output as the verified disparity image 35 together with a safety flag indicating "safe". If the recalculated disparity data does not match the corresponding original disparity data 31 within certain tolerances, the safety flag would be set to indicate "not safe". Therefore, the safety flag is preferably a binary flag.

It may also be possible to amend the original disparity image 31 using the re-calculated disparity data, and to output the amended disparity image, together with the flag indicating "safe", as the verified image 35. Other subsets than rows of the original disparity image 31 may be re-calculated for performing the verification 36. Alternatively, the whole original disparity image 31 may be re-calculated in the verification 36. In this case, expediently the whole re-calculated disparity image is output as the verified disparity image 35.

Preferably, the gatekeeper code module 33 is executed on a dedicated hardware device 19, i.e. a separate electronic processing device 19 different from the processing device 14 executing the object detection code 15. The dedicated functional safety processing device 19 may be of a type mentioned above with respect to the processing device 14. Preferably, a smaller and lower-cost dedicated functional safety processing device 19 as compared to the processing device 14, i.e. one with less processing capacities, may be well sufficient for executing the gatekeeper code module 33. The verification code 36 may preferably be executed on the same processing device 19 as the gatekeeper code module 33 for similar reasons.

Figure 3:
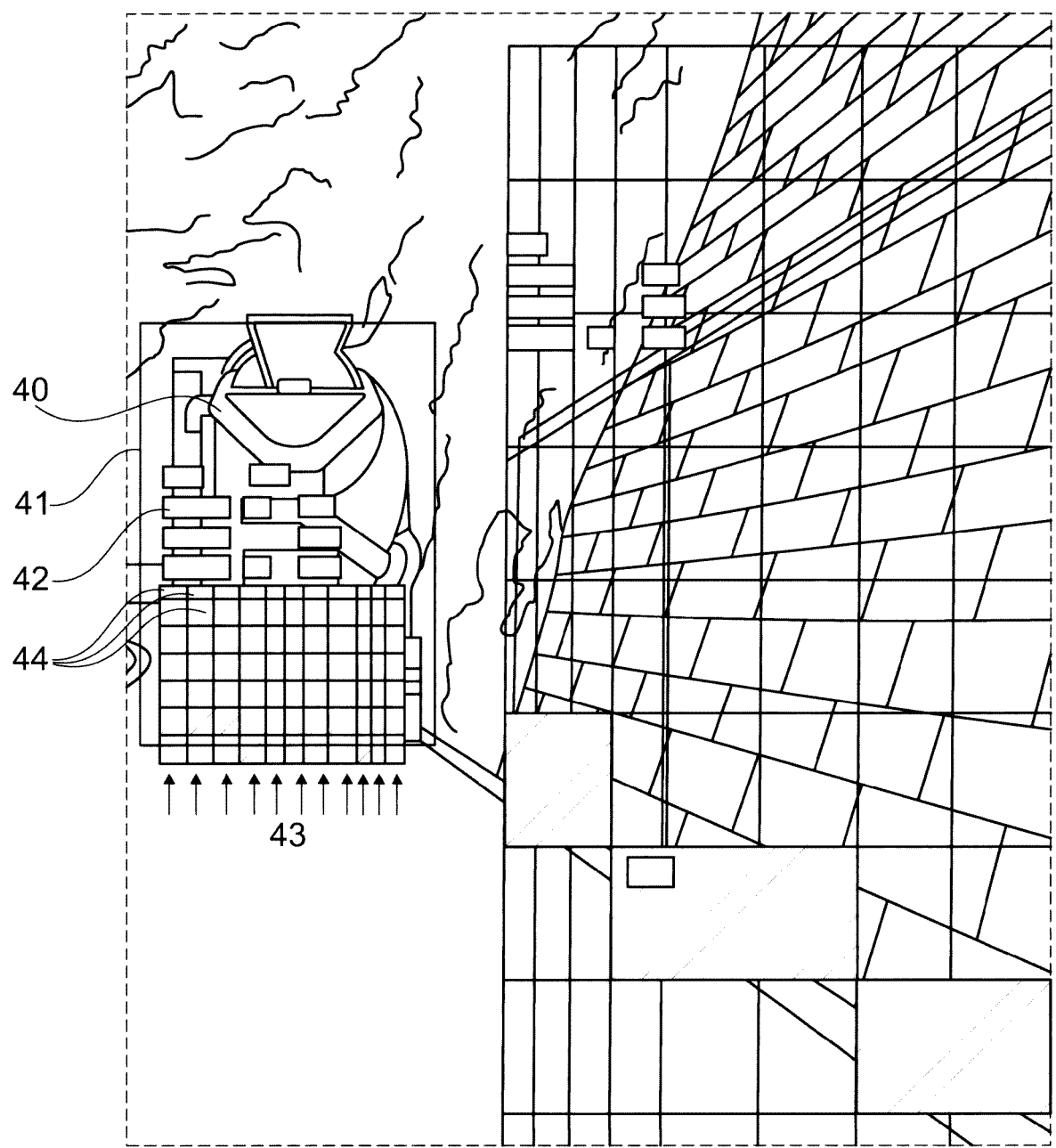
FIG. 3 shows a captured image for illustrating operation of the gatekeeper code module.

The operation of the gatekeeper module 33 in a preferred embodiment is illustrated on the basis of FIG. 3, showing an image captured by the imaging apparatus 11, where a truck 40 is present on the road in front of the ego vehicle. It may be assumed that the truck 40 has been detected by the QM object detection code 15, yielding an object bounding box 41. The gatekeeper module 33 considers the verified depth image 35 (not shown) in the region of the object bounding box 41 provided by the QM object detection code 15. In other words, the world coordinates of the detected object 32 are projected on the verified disparity image 35, resulting in a corresponding bounding box 41.

Specifically, the gatekeeper module 33 defines a grid 42 in the bounding box 41, or covering the bounding box 41, or covering the object 40 within the bounding box 41. The grid 42 may be an n×m grid, where n>1 and m>1 are integers, defining n columns 43, m rows and n×m boxes 44. In FIG. 3, for example, n=10. The columns 43 form sub-areas in the language of the claims. Each box 44 is assigned dimensions, in particular a width and a height, corresponding to the maximum allowed position error for the detected object to be considered safe.

The gatekeeper module 33 starts the verification at one end, for example the lower end, of one column 43, for example the leftmost column 43. That is, the lowest box 44 in the leftmost column is compared against the longitudinal distance world coordinate at the part of the detected object corresponding to the box 44. If the longitudinal distance of the detected object in the box 44, as calculated by the object detection code 15, matches the depth of the box 44 in the verified depth image 35 within predefined tolerances, the whole corresponding column 43 (here the leftmost column 43) is regarded safe. If not, the gatekeeper goes up one box in the same column 43, here the leftmost column 43, and performs the same comparison again for that box, and so on. Generally, the first match of a box within a particular sub-area (here leftmost column 43) is regarded sufficient for considering the matching condition fulfilled for the whole particular sub-area 43. Therefore, upon the first match, the gatekeeper module 33 goes to the next column 43, here the second-to-left column 43, and repeats the same process, starting with the lowest box 44 of the second-to-left column 43.

After all, if at least one box 44 in each column 43 fulfils the matching condition, the detected object 40 is considered safe at the higher functional safety level, like ASIL-B. The gatekeeper 33 lets the safe object 34 pass such that safety-critical decisions like active braking or steering assistance may be based on it.

Furthermore, if only a very small number of columns 43, like only one column 43, fails to fulfil the matching condition (i.e., all boxes of the column 43 fail to fulfil the matching condition), the detected object 40 may still be considered safe at the higher functional safety level, like ASIL-B.

On the other hand, if the number of columns 43 which fail to fulfil the matching condition exceeds a predetermined number, like more than one failing column 43, the detected object 40 is considered unsafe at the higher functional safety level, like ASIL-B. The gatekeeper 33 rejects or discards the unsafe object 32, i.e. it cannot pass, such that safety-critical decisions like active braking or steering assistance cannot be based on it.

Generally, in the above procedure, a matching condition is considered fulfilled if a sufficient number of disparity pixels in the box 44 under consideration of the verified depth image 35 have a sufficiently similar longitudinal distance as the detected object 32 has at the part of the detected object corresponding to the box 44.

While the above description constitutes the preferred embodiment of the present invention, it will be appreciated that the invention is susceptible to modification, variation and change without departing from the proper scope and fair meaning of the accompanying claims.

The invention claimed is:

1. A vision system for a motor vehicle, comprising:
at least one processor configured to:
execute an object detection code having a first functional safety level and configured to: detect a plurality of objects in a surrounding of the motor vehicle by processing images; and calculate for a detected object its longitudinal distance relative to the vehicle;
execute a verification code having a higher functional safety level than the object detection code, wherein the verification code is configured to obtain a verified depth or disparity image by re-calculating original depth or disparity data from a depth or disparity image calculator for a subset of a depth or disparity image, compare the re-calculated depth or disparity data with an original of the depth or disparity data, and verify the depth or disparity image based on the comparison; and
execute a gatekeeper code module having a second functional safety level, the gatekeeper code module configured to:
divide an area associated with the detected object into a grid comprising a plurality of columns and a plurality of rows, wherein intersection of each column of the plurality of columns and each row of the plurality of rows comprises a respective box; and
compare a longitudinal distance calculated by the object detection code for a portion of the detected object within a box of the grid to one or more depth values in an area of the verified depth or disparity image corresponding to the portion of the detected object within the box to evaluate if the depth or disparity image, in at least a part of the area of the verified depth or disparity image, matches within given tolerances the longitudinal distance of the detected object given by the object detection code,
wherein the first functional safety level and the second functional safety level each correspond to ratings for at least one of reliability and risk reduction, and wherein the second functional safety level has a higher rating than the first functional safety level for the at least one of reliability and risk reduction.

2. The vision system as claimed in claim 1, further comprising the verification code is executed on a dedicated electronic processing device.

3. The vision system as claimed in claim 1, wherein the gatekeeper code module is executed on a dedicated electronic processor independent from a processor of the at least one processor executing the object detection code.

4. The vision system as claimed in claim 1, wherein the rating of the second functional safety level for the at least one of reliability and risk reduction includes the Automotive Safety Integrity Level (ASIL) risk classification scheme, and the second functional safety level of the gatekeeper code module is at least an ASIL-B functional safety level.

5. The vision system as claimed in claim 1, wherein the first functional safety level is a non-critical functional safety level.

6. The vision system as claimed in claim 5, wherein the non-critical safety level is a Quality Management (QM) functional safety level.

7. The vision system as claimed in claim 1, wherein:
the object detection code is configured to output bounding boxes for the plurality of objects; and
to divide the area associated with the object into the grid, the gatekeeper code module is configured to divide a bounding box of the plurality of bounding boxes into the grid.

8. The vision system of claim 1, wherein the subset of the depth or disparity image comprises a subset of rows of the depth or disparity image.

9. A vision method for a motor vehicle, comprising:
executing, by at least one processor, an object detection code having a first functional safety level to detect a plurality of objects in a surrounding of the motor vehicle by processing captured images, and to calculate for a detected object its longitudinal distance relative to the vehicle;
executing, by the at least one processor, a verification code having a higher functional safety level than the object detection code, the verification code obtaining a verified depth or disparity image by re-calculating original depth or disparity data from a depth or disparity image calculator for a subset of a depth or disparity image, comparing the re-calculated depth or disparity data with an original of the depth or disparity data, and verifying the depth or disparity image based on the comparison; and
executing, by the at least one processor, a gatekeeper code module having a second functional safety level, the gatekeeper code module;
dividing an area associated with the detected object into a grid comprising a plurality of columns and a plurality of rows, wherein intersection of each column of the plurality of columns and each row of the plurality of rows comprises a respective box; and
comparing a longitudinal distance calculated for a portion of the detected object within a box of the grid to one or more depth values in an area the verified depth or disparity image corresponding to a portion of the detected object within the box to evaluate if a depth or disparity image, in at least a part of the area of the verified depth or disparity image, matches within given tolerances the longitudinal distance of the detected object given by the object detection code,
wherein the first functional safety level and the second functional safety level each correspond to ratings for at least one of reliability and risk reduction, and
wherein the second functional safety level has a higher rating than the first functional safety level for the at least one of reliability and risk reduction.

10. The vision method as claimed in claim 9, wherein the gatekeeper code module is executed on a dedicated electronic processor independent from a processor of the at least one processor executing the object detection code.

11. The vision method as claimed in claim 9 further comprising calculating the verified depth or disparity image by a depth or disparity image calculation code having a lower functional safety level than the gatekeeper code module, and calculating, by the verification code, a safety flag indicating a safe condition or a not safe condition.

12. An apparatus comprising:
a memory; and
at least one processor communicatively coupled to the memory and configured to:
detect a plurality of objects in a surrounding of the apparatus by processing images;
calculate for a detected object its longitudinal distance relative to the apparatus, wherein the detection is associated with a first functional safety level;
re-calculate original depth or disparity data for a subset of a depth or disparity image;
compare the re-calculated depth or disparity data with an original of the depth or disparity data;
verify the depth or disparity image based on the comparison to obtain a verified depth or disparity image, wherein the verification is associated with a higher functional safety level than the first functional safety level;
divide an area associated with the detected object into a grid comprising a plurality of columns and a plurality of rows, wherein intersection of each column of the plurality of columns and each row of the plurality of rows comprises a respective box; and
compare a longitudinal distance calculated for a portion of the detected object within box of the grid to one or more depth values in an area of the verified depth or disparity image corresponding to the portion of the detected object within the box to evaluate if the depth or disparity image, in at least a part of the area of the verified depth or disparity image, matches within given tolerances the longitudinal distance of the detected object based on the verified depth or disparity image, wherein the evaluation is associated with a second functional safety level, wherein the first functional safety level and the second functional safety level each correspond to ratings for at least one of reliability and risk reduction, and wherein the second functional safety level has a higher rating than the first functional safety level for the at least one of reliability and risk reduction.

13. The apparatus of claim 12, wherein the at least one processor is configured to:
calculate the depth or disparity image, wherein the calculation is associated with a lower functional safety level than the second functional safety level; and
provide a safety flag indicating a safe condition or a not safe condition based on the verification of the depth or disparity image.

14. The apparatus of claim 12, wherein:
the at least one processor is configured to output bounding boxes for the plurality of objects; and to divide the area associated with the object into the grid, the at least one processor is configured to divide a bounding box of the plurality of bounding boxes into the grid.

15. The apparatus of claim 12, wherein the at least one processor is configured to discard the detected object if a matching condition associated with the comparison of the longitudinal distance for the box of the grid to the one or more depth values in the area of the verified depth or disparity image is not fulfilled for a predetermined number of the plurality of boxes.

16. The apparatus of claim 12, wherein the subset of the depth or disparity image comprises a subset of rows of the depth or disparity image.

17. The apparatus of claim 16, wherein the at least one processor is configured to determine that a matching condition is fulfilled if a sufficient number of disparity pixels in the area of the verified depth image has a sufficiently similar longitudinal distance as the box.

18. The apparatus of claim 12, wherein the at least one processor is configured to determine whether each box of the plurality of boxes has dimensions corresponding to an allowed position error for the detected object to be considered a safe condition.

19. The apparatus of claim 12 comprising an optical imaging device configured to capture the images from the surrounding of the apparatus-motor vehicle.

20. The apparatus of claim 12, wherein the processor is configured to activate driver assistance based on the comparison.

21. The apparatus of claim 20, wherein the driver assistance comprises at least one of automatic braking assistance and steering assistance.

* * * * *